United States Patent
Barron et al.

(10) Patent No.: US 7,065,207 B2
(45) Date of Patent: Jun. 20, 2006

(54) CONTROLLING ATTENUATION DURING ECHO SUPPRESSION

(75) Inventors: David L. Barron, Scottsdale, AZ (US); William C. Yip, Phoenix, AZ (US); Sean S. You, Tempe, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 293 days.

(21) Appl. No.: 10/660,446

(22) Filed: Sep. 11, 2003

(65) Prior Publication Data

US 2005/0058277 A1    Mar. 17, 2005

(51) Int. Cl.
H04B 3/23    (2006.01)
(52) U.S. Cl. .............................. 379/406.07; 379/406.08
(58) Field of Classification Search ............ 379/406.07
See application file for complete search history.

(56) References Cited

U.S. PATENT DOCUMENTS

| | | | |
|---|---|---|---|
| 4,064,379 A * | 12/1977 | Horna ................... | 379/406.11 |
| 4,165,449 A | 8/1979 | Vachon | |
| 4,213,014 A | 7/1980 | Luder | |
| 4,282,411 A | 8/1981 | Stewart | |
| 4,368,360 A | 1/1983 | Sato | |
| 4,546,216 A | 10/1985 | Tegethoff | |
| 4,628,156 A | 12/1986 | Irvin | |
| 4,852,081 A | 7/1989 | Bonnet | |
| 4,864,608 A | 9/1989 | Miyamoto | |
| 4,885,755 A | 12/1989 | Yoshida | |
| 5,016,271 A | 5/1991 | Ford | |
| 5,271,057 A | 12/1993 | Addeo | |
| 5,283,784 A * | 2/1994 | Genter .................. | 379/406.07 |
| 5,327,495 A | 7/1994 | Shenoi | |
| 5,381,475 A | 1/1995 | Cavallo | |
| 5,390,250 A * | 2/1995 | Janse et al. ............ | 379/406.08 |
| 5,563,944 A | 10/1996 | Hasegawa | |
| 5,619,566 A | 4/1997 | Fogel | |
| 5,668,794 A | 9/1997 | McCaslin | |
| 5,790,657 A | 8/1998 | Fujiwara | |
| 5,852,661 A | 12/1998 | Chen | |
| 6,148,078 A | 11/2000 | Romesburg | |
| 6,160,886 A | 12/2000 | Romesburg | |
| 6,282,176 B1 | 8/2001 | Hemkumar | |
| 6,532,289 B1 | 3/2003 | Magid | |
| 6,542,611 B1 | 4/2003 | Lane et al. | |

OTHER PUBLICATIONS

Product Data Sheet, Motorola DSP 56001, May 4, 1998, pp. 1-2.*

* cited by examiner

*Primary Examiner*—Sinh Tran
*Assistant Examiner*—Daniel Swerdlow
(74) *Attorney, Agent, or Firm*—James L. Clingan, Jr.; David G. Dolezal

(57) ABSTRACT

An echo canceling system receives and transmits audio signals between a far end and a near end. During single talk, which is when only one end is originating audio, the path back to the originator is impeded by echo cancellation and attenuation. When there is double talk, which is when both ends are originating audio, the attenuation is removed, or at least significantly reduced. This is achieved by using ERLE, which itself is a known signal used for other purposes in an echo cancellation system, to provide information as to when double talking is occurring. This allows for stopping the attenuation for the double talk situation, which is the desired result.

36 Claims, 2 Drawing Sheets

CONTROLLING ATTENUATION DURING ECHO SUPPRESSION

FIELD OF THE INVENTION

The invention relates to echo suppression, and more particularly to controlling the echo suppression.

RELATED ART

In telephonic communication, it has become common to use speaker phones or other such equipment that does not require users to hold equipment to their ears. This provides for the ability to use both hands while communicating and for multiple people to be involved in the same conversation. The free use of both hands is becoming particularly important in the use of cell phones in an automobile. One of the difficulties in any such system is that the output of a speaker is picked-up by a microphone. One alternative, known as half duplex operation, has been to simply turn off one while the other operates. Thus, only one of the speaker or microphone is operational at a given point in time, but this is not desirable for maximizing natural communication. Another alternative, which provides more natural communication, is to operate in full duplex mode. In order to allow this, echo cancellation has been introduced. This has been effective but often the conversation still does not seem natural because of the cancellation process and the echo cancellation is generally not completely effective.

The performance of a typical acoustic echo canceller in practice is limited by nonlinearities of the devices in the signal path as well as the ambient noise of the near end environment. Due to these limitations an echo canceller may be capable of delivering only 25 dB to 30 dB of attenuation in the echo path. This implies that during periods of single talk, where only the far-end speaker is active, there may still be some small amount of audible echo reflected back to the far end. This can be very annoying to the one speaking at the far end. Therefore it is usually necessary to add some additional attenuation into the signal path during far end only activity. This is typically accomplished by inserting a non-linear echo suppressor function into the echo path following the echo canceller.

Typically echo suppressors add attenuation by ramping the attenuation factor up or down at some predefined constant rate based on the presence of far end and/or near end energies. This has the effect of creating a trapezoidal attenuation window around the speech envelopes and will invariably either cut off the beginning of the near end speech or allow significant echo to pass. The double talk performance of these systems is less than desirable.

Thus, there is a need to provide echo cancellation and attenuation that reduces distortion in a double talk situation.

BRIEF DESCRIPTION OF THE DRAWINGS

The present invention is illustrated by way of example and not limited by the accompanying figures, in which like references indicate similar elements, and in which.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION OF THE DRAWINGS

In one form, echo suppression is controlled by providing a signal that is a mix of error signal and comfort noise. The mix of these two is selected based on the energies of an input signal and an error signal. This is better understood with reference to the drawings and the following description.

Figure 1:
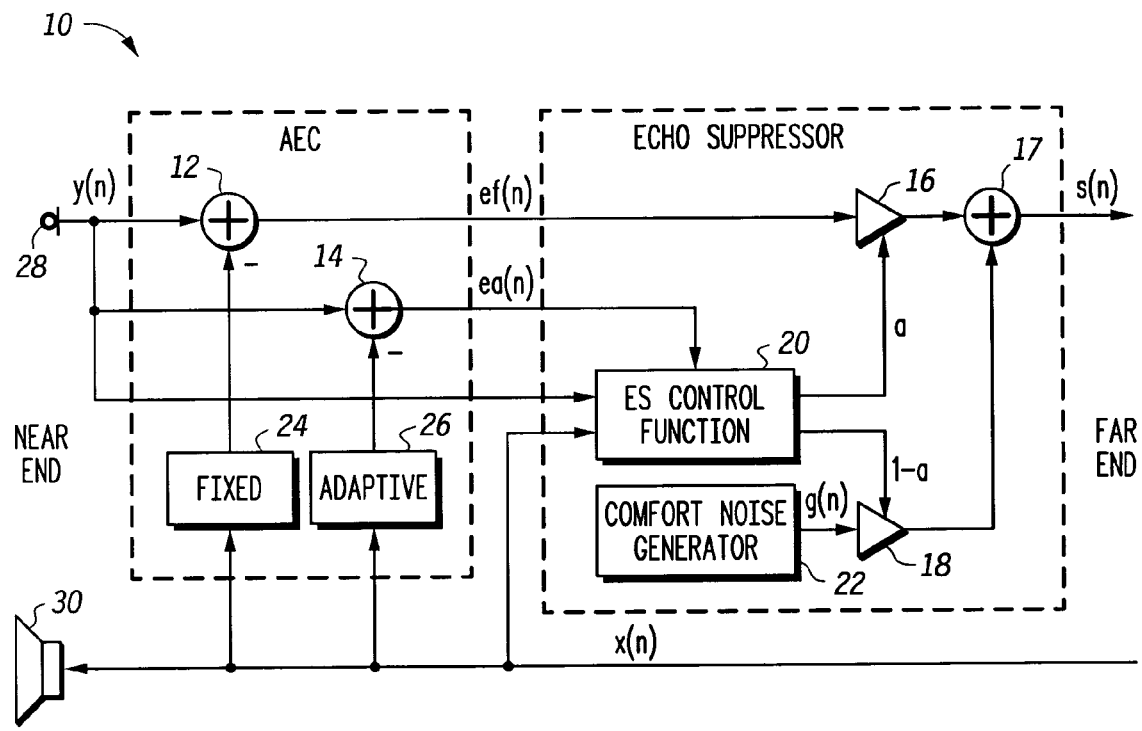
FIG. 1 is a functional block diagram of a circuit according to a preferred embodiment of the invention.

Shown in FIG. 1 is an echo cancellation circuit 10 comprising an adder 12, an adder 14, a controlled amplifier 16, an adder 17, a controlled amplifier 18, an echo suppression (ES) control function 20, a comfort noise generator 22, a fixed filter 24, and an adaptive filter 26, a microphone 28, and a speaker 30. Speaker 28 and 30 are considered the near end. A signal x(n) is received and provided as an input to speaker 30 which provides an audio output. This audio output is received by microphone 28, which has an output coupled to an input of adder 12 and an input of adder 14. Microphone 12 receives other audio, e.g., background noise and anything spoken by a user at the near end. Thus whatever audio that is received by microphone 28 is converted to an electrical signal y(n) that is received by adder 12 and adder 14. Fixed filter 24 has an input coupled to receive signal x(n) and an output coupled to adder 12. Similarly, Adaptive filter 26 has an input coupled to receive signal x(n) and an output coupled to adder 14. Adder 12 has an output for providing an error signal ef(n). Adder 14 has an output for providing an error signal ea(n). Controlled amplifier 16 has a signal input coupled to the output of adder 12 for receiving signal ef(n), a control input coupled to a first output of ES control function 20, and an output coupled to a signal input of adder 17. Adder 17 has an output for providing an error signal s(n). Controlled amplifier 18 has a signal input coupled to comfort noise generator, a control input coupled to a second output of ES control function 20, and an output coupled to a control input of adder 17. ES control function 20 has a first input coupled to receive signal y(n) and a second input coupled to receive signal x(n).

In operation, speaker 30 responds to signal x(n) by providing audio when signal x(n) is provided. Fixed filter 24 responds to signal x(n) by providing a signal to adder 12 with a selected relationship to signal x(n). Similarly, adaptive filter 26 responds to signal x(n) by providing a signal to adder 14 with a selected relationship to signal x(n). Signal ef(n) is attenuated by controlled amplifier 16 according to a factor a which is a positive number less than one. If a equals "1" there is no attenuation. If a equals "0" signal ef(n) is completely blocked. Similarly controlled amplifier 18 attenuates signal g(n) from comfort noise generator 22 based on one minus factor a. Thus, adder 17 thus receives signals ef(n) and g(n) in attenuated form. Adder 17 thus provides signal s(n) as a combination of these attenuated forms of signals ef(n) and g(n).

Figure 3:
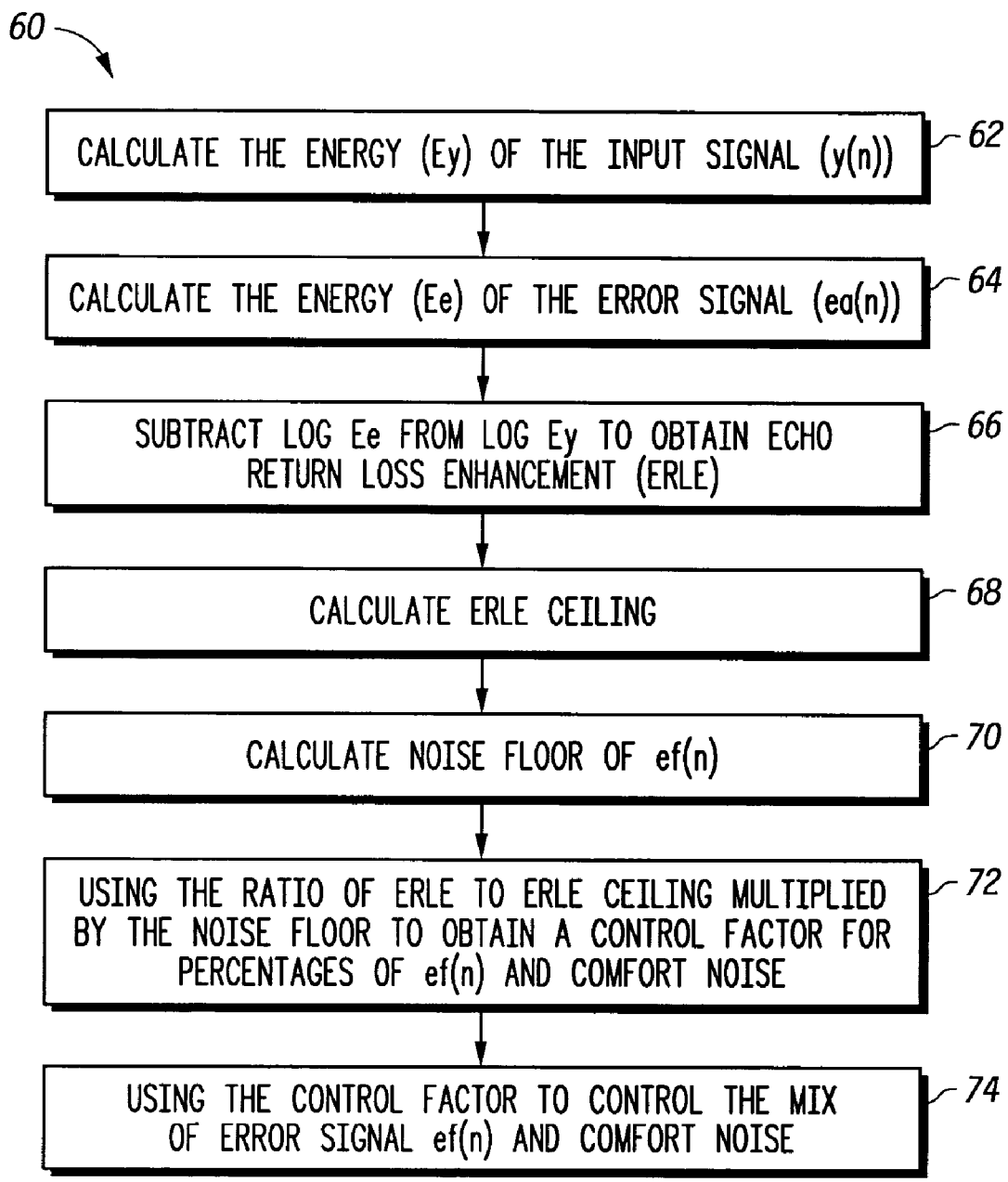
FIG. 3 is a flow diagram showing a method for the preferred embodiment of the invention.

The factor a is obtained by the use of ES control function 20. ES control function 20 calculates ERLE by using the output of adder 14 and signal y(n). ES control function 20 then calculates factor a using the ERLE. The use of an adaptive filter, signal y(n), and an adder to find the ERLE is known in the art and may be achieved in such a manner for this purpose. The factor is calculated as shown in FIG. 3. The ERLE is obtained by calculating the energy (Ey) of the input signal y(n) and the energy (Ee) of the error signal ea(n) as shown in steps 62 and 64 followed by subtracting the log of Ee from the log of Ey. The ERLE is calculated using the output of adder 14 which is coupled to adaptive filter 26 rather than adder 12, which is coupled to fixed filter 24. A ceiling for ERLE is calculated as shown in step 68. The ceiling is a recent maximum of ERLE. Recent, in this particular example, means that the maximum ERLE is allowed to decay at a slow rate and is used for determining how well the filter should currently be performing. Similarly, a floor is calculated for e(n) shown as step 70. The noise floor is a long term average of ef(n) for the case when there is no speech present. This average is taken when Ey is below a selected threshold. The calculation for the noise floor is well known to one of ordinary skill in the art. The factor a is obtained, shown as step 72, using the ratio of the ERLE to the ceiling of the ERLE and multiplying that ratio by the floor of e(n). Because the noise floor is a negative number, this term is also a negative number. These calculations are of algorithms so the resulting term is the algorithm of factor a and has a scaling factor added as well. To obtain the actual factor a, this term is converted to factor a by applying it as an exponent. The negative exponent ensures that factor a is a number between 0 and 1. This step 72 produces factor a, which is used to control the attenuation of signals of error signal ef(n) and comfort noise g(n), shown in step 74. The scaling factor is for adjusting the total amount of attenuation provided by attenuation factor a for different environments with differing levels of ambient noise.

The equations for the exponent (e) and factor a, where m is the scaling factor, are as follows:

$$e = (ERLE/\text{Ceiling})(\text{Noise floor})$$

$$a = 10^{me}$$

For the case in which there is no signal coming from the far end, signal x(n) is small, and for simplicity is considered zero for this example. When signal x(n) is zero, adaptive filter 24 provides no canceling signal to adder 12 so that signal ea(n) and signal y(n) are the same. In such case, ERLE is zero. With ERLE zero, the exponent in obtaining factor a is zero. With the exponent at zero, factor a becomes 1. Thus, for the case in which signal x(n) is without energy, factor a is one which causes signal ef(n) to not be attenuated and signal g(n) to be completely blocked. In this case, signal y(n) is effectively passed through as error signal s(n), which is the output provided to the far end. This is the desirable result, because there is no need for additional attenuation when all of the audio that is being generated by the system is at the near end and that audio is being received at the far end.

For the case in which there are relatively large signals at both x(n) and y(n), which is the double talk situation, adaptive filter 26 will diverge due to the uncorrelated energy of signals x(n) and y(n) and will provide no significant echo cancellation. Thus, in such case, ea(n) is very close to y(n). With the result of there being no difference between y(n) and ea(n), ERLE is calculated to be zero. Thus results in a zero exponent so that a is one. With factor a at zero, controlled amplifier 16 provides no attenuation and controlled amplifier provides complete blocking with the result of signal ef(n) passing through as signal s(n). Thus, in the double talk situation, in which the predominant information in both directions is valid, there is no additional attenuation added by the echo suppressor.

For the case in which signal x(n) is large and there is no audio being originated at the near end, which is a single talk situation, signal y(n) receives significant echo cancellation at adder 14 due to adaptive filter 26. Since no audio is being generated from the near end, signal y(n) is all echo so that signal ef(n) is preferably zero and the difference between signal y(n) and signal ea(n) is large. With a large difference between the energy of y(n) and ea(n), ERLE is relatively large. With ERLE relatively large, the exponent is a relatively large negative number with the result that factor a is effectively zero. With factor a at zero, controlled amplifier 16 provides no input to adder 17 whereas controlled amplifier 18 passes signal g(n) unattenuated to adder 17. The result in such a case is that signal s(n) is provided as comfort noise without error signal being present.

Figure 2:
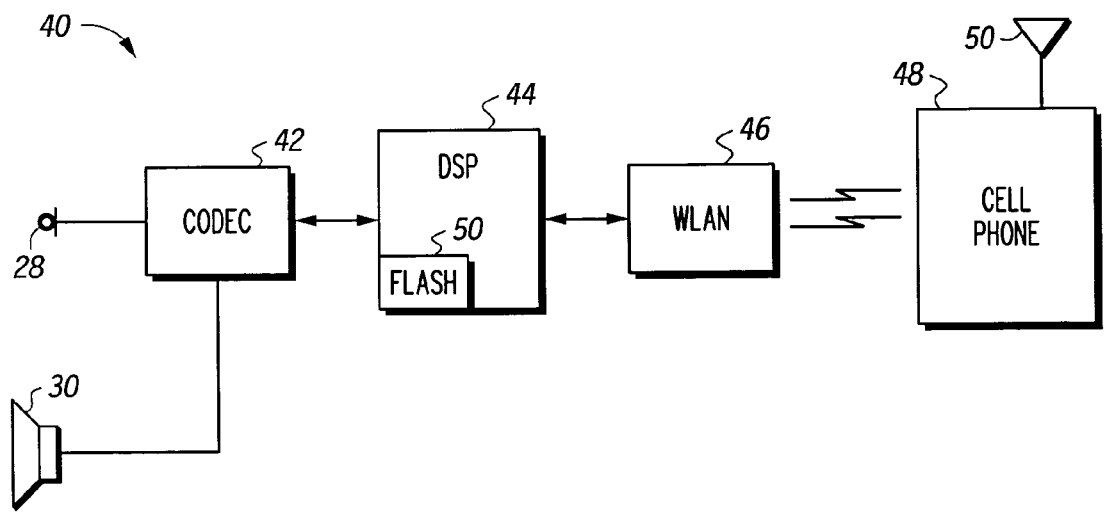
FIG. 2 is a hardware block diagram useful in implementing the embodiment of FIG. 1.

Adaptive filter 26 loses correlation very quickly if there is audio originated from the near end. Thus, any speech from the near end will cause signal y(n) to be less correlated to x(n) resulting in adaptive filter 26 losing correlation and making signal ea(n) the same as y(n), which in turn causes factor a to become 1, thereby passing ef(n) as s(n). The equation used for factor a is as follows:

Shown in FIG. 2 is a phone system 40 as used in an automobile, comprising a microphone 28, a speaker 30, a codec 42, a DSP 44 having a flash memory 50, a wireless local area network (WLAN) 46, and a cell phone 48 with an antenna 50. Codec 42 provides needed coding and decoding between the DSP 44 and the speaker 30 and microphone 28. DSP 44 provides the functionality shown in FIG. 1 and is directed by software stored in flash memory 50. DSP 44 is coupled to the cell phone 48 via WLAN 46. Speaker 28 and 30 are inside the automobile and cell phone 48 provides the communication link with a party outside the automobile.

In the foregoing specification, the invention has been described with reference to specific embodiments. However, one of ordinary skill in the art appreciates that various modifications and changes can be made without departing from the scope of the present invention as set forth in the claims below. For example, signal x(n) is shown being directed connected to fixed filter 24, adaptive filter 26, and speaker 30. Such signal x(n) would be buffered in different ways for each of these elements. In particular, speaker 30 would need different buffering than would filters 24 and 26. Similarly, controlled amplifiers 18 and 16 may provide an output of a greater magnitude than the input signal for the cases where the signal is to be passed. Also, comfort noise generator 22 may be excluded so that no comfort noise is generated or passed through as signal s(n) while the operation of controlled amplifier 16 could be maintained. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method comprising:
   filtering a far end signal to produce an estimate of an echo in a near end signal;
   subtracting the estimate from the near end signal to produce an error signal;

calculating an echo return loss enhancement using the error signal;
calculating an attenuation factor using the echo return loss enhancement; and
attenuating a first signal based upon the attenuation factor, wherein the first signal includes a component of the near end signal, wherein:
    the calculating the attenuation factor using the echo return loss enhancement further includes calculating an echo return loss enhancement ceiling value, wherein the echo return loss enhancement ceiling value is calculated from a previous maximum calculated echo return loss enhancement; and
    the calculating the attenuation factor using the echo return loss enhancement further includes dividing the echo return loss enhancement by the ceiling value.

2. The method of claim 1 further comprising
filtering the far end signal to produce a second estimate of an echo in the near end signal; and
subtracting the second estimate from the near end signal to produce the first signal.

3. The method of claim 1 wherein the first signal is formed from subtracting an estimate of an echo of the far end signal from the near end signal.

4. The method of claim 1 wherein the filtering is characterized as adaptive filtering.

5. The method of claim 1 wherein: the echo return loss enhancement is calculated in the logarithmic domain.

6. The method of claim 1 wherein the calculating the attenuation factor using the echo return loss enhancement further includes:
adjusting the echo return loss enhancement by an environmental attenuation factor.

7. The method of claim 1 further comprising:
adding a comfort noise signal to the first signal based upon the attenuation factor.

8. The method of claim 7 wherein the attenuating a first signal based upon the attenuation factor and the adding a comfort noise signal to the first signal based upon the attenuation factor are performed to produce a second signal according to the following:

$$S=M(a)+N(1-a);$$

wherein S is the second signal;
wherein M is one of the first signal or the comfort noise signal;
wherein N is the other of the of the first signal or the comfort noise signal; and
wherein a is the attenuation factor.

9. The method of claim 1 wherein the near end signal represents audio sounds received from a microphone.

10. The method of claim 1 wherein the greater the echo return loss enhancement, the greater the attenuation of the attenuating.

11. The method of claim 1 wherein the attenuation factor is given by the following:

the attenuation factor=$10^{(ERLE*c)}$;

wherein ERLE is the echo return loss enhancement and c is one of a constant or a variable;
wherein ERLE is calculated in the logarithmic domain.

12. The method of claim 11 wherein the attenuation factor ranges between 0 and 1.

13. The method claim 1 wherein the filtering, the subtracting, the calculating, the calculating the attenuation factor, and the attenuating are performed by a processor.

14. A computer readable medium storing code whose execution performs the method of claim 1.

15. The method of claim 1 wherein the first signal is attenuated by no amount to a relatively a low amount during a double talk condition.

16. A method comprising:
filtering a far end signal to produce an estimate of an echo in a near end signal;
subtracting the estimate from the near end signal to produce an error signal;
calculating an echo return loss enhancement using the error signal;
calculating an attenuation factor using the echo return loss enhancement; and
attenuating a first signal based upon the attenuation factor, wherein the first signal includes a component of the near end signal, wherein:
    the calculating the attenuation factor using the echo return loss enhancement further includes calculating a noise floor value; and
    the calculating the attenuation factor using the echo return loss enhancement further includes multiplying the echo return loss enhancement by the noise floor.

17. The method of claim 16 wherein
the echo return loss enhancement is calculated in the logarithmic domain.

18. An echo cancellation system comprising:
an echo canceller, the echo canceller provides an error signal from a near end signal and a far end signal;
an attenuator, the attenuator attenuates a first signal based upon an attenuation factor, wherein the first signal includes a component of the near end signal; and
an attenuation factor calculator, the attenuation factor calculator calculates an echo return loss enhancement using the error signals, calculates the attenuation factor using the echo return loss enhancement, calculates an echo return loss enhancement ceiling value from a previous maximum calculated echo return loss enhancement, and calculates the attenuation factor by dividing the echo return loss enhancement by the ceiling value.

19. The echo cancellation system of claim 18 further comprising:
a second echo canceller, the second echo canceller providing the first signal from the near end signal and the far end signal.

20. The echo cancellation system of claim 18 wherein the echo canceller is characterized as an adaptive filter.

21. The echo cancellation system of claim 18 wherein the echo canceller is characterized as a linear echo canceller.

22. The echo cancellation system of claim 18 wherein the attenuation factor calculator calculates a noise floor value, the attenuation factor is calculated the noise floor value.

23. The echo cancellation system of claim 18 wherein the attenuation factor is calculated using an environmental attenuation factor.

24. The echo cancellation system of 18 further comprising:
a comfort noise generator, the comfort noise generator provides a provides a comfort noise signal;
a comfort noise attenuator, the comfort noise attenuator attenuates the comfort noise signal based upon the attenuation factor;
a summer, the summer combines the comfort noise signal attenuated by the comfort noise generator and the first signal attenuated by the attenuator to produce a combined signal.

25. The echo cancellation system of claim 24 wherein the summed signal is produce according to the following:

$$S=M(a)+N(1-a);$$

wherein S is the combined signal;
wherein M is one of the first signal or the comfort noise signal;
wherein N is the other of the of the first signal or the comfort noise signal; and
wherein a is the attenuation factor.

26. The echo cancellation system of claim 18 wherein the attenuation factor is given by the following:

$$\text{attenuation factor}=10^{\wedge}(ERLE*c);$$

wherein ERLE is the echo return loss enhancement and c is one of a constant or a variable;
wherein ERLE is calculated in the logarithmic domain.

27. The echo cancellation system of claim 18 wherein the greater the echo return loss enhancement, the greater the attenuation by the attenuator.

28. A communication device including the echo cancellation system of claim 18.

29. The communication device of claim 28 wherein the echo cancellation system of claim 19 is utilized in a two way communication path for providing at least voice information.

30. The communication device of claim 29 wherein the communication path includes a wireless communication path with a cellular phone.

31. The communication device of claim 29 wherein the communication device is characterized as providing hands free communication to a near end user.

32. The communication device of claim 28 wherein the echo cancellation system is implemented in an automobile sound system.

33. The echo cancellation system of claim 18 wherein the echo canceller, the attenuator, and the an attenuation factor calculator are implemented by a processor executing code.

34. The echo cancellation system of claim 18 wherein the echo canceller is an acoustic echo canceller.

35. The echo cancellation system of claim 18 wherein the echo cancellation system is utilized in a communications device for implementing full duplex communication.

36. An echo cancellation system comprising:
an echo canceller, the echo canceller provides an error signal from a near end signal and a far end signal;
an attenuator, the attenuator attenuates a first signal based upon an attenuation factor, wherein the first signal includes a component of the near end signal
means for providing the attenuation factor calculated using an echo return loss enhancement, the echo return loss enhancement is calculated using the error signal and includes calculating a noise floor value and multiplying the echo return loss enhancement by the noise floor value.

* * * * *

UNITED STATES PATENT AND TRADEMARK OFFICE
CERTIFICATE OF CORRECTION

PATENT NO. : 7,065,207 B2
APPLICATION NO. : 10/660446
DATED : June 20, 2006
INVENTOR(S) : David Lee Barron It is certified that error appears in the above-identified patent and that said Letters Patent is hereby corrected as shown below:

In Column 5, Line 48, Claim No. 8:
 Change "wherein N is the other of the of the first signal" to --wherein N is the other of the first signal--

In Column 6, Line 4, Claim No. 15:
 Change "no amount to a relatively a low amount" to --no amount to a relatively low amount--

In Column 7, Line 2, Claim No. 25:
 Change "summed signal is produce according to" to --summed signal is produced according to--

In Column 7, Line 7, Claim No. 25:
 Change "wherein N is the other of the of the first" to --wherein N is the other of the first--

In Column 7, Line 22, Claim No. 29:
 Change "echo cancellation system of claim 19 is utilized" to --echo cancellation system of claim 18 is utilized--

In Column 8, Line 8, Claim No. 33:
 Change "echo canceller, the attenuator, and the an attenuation" to --echo canceller, the attenuator, and the a attenuation--

UNITED STATES PATENT AND TRADEMARK OFFICE
CERTIFICATE OF CORRECTION

| | | |
|---|---|---|
| PATENT NO. | : 7,065,207 B2 | |
| APPLICATION NO. | : 10/660446 | |
| DATED | : June 20, 2006 | |
| INVENTOR(S) | : David Lee Barron | |

It is certified that error appears in the above-identified patent and that said Letters Patent is hereby corrected as shown below:

In Column 8, Line 20, Claim No. 36:
    Change "includes a component of the near end signal" to --includes a component of the near end signal;--

Signed and Sealed this

Twenty-seventh Day of May, 2008

JON W. DUDAS
*Director of the United States Patent and Trademark Office*